United States Patent
Winter

(10) Patent No.: US 9,158,469 B2
(45) Date of Patent: Oct. 13, 2015

(54) FLASH BASED MEMORY COMPRISING A FLASH TRANSLATION LAYER AND METHOD FOR STORING A FILE THEREIN

(75) Inventor: Marco Winter, Hannover (DE)

(73) Assignee: Thomson Licensing (FR)

( * ) Notice: Subject to any disclaimer, the term of this patent is extended or adjusted under 35 U.S.C. 154(b) by 818 days.

(21) Appl. No.: 12/998,640

(22) PCT Filed: Nov. 12, 2009

(86) PCT No.: PCT/EP2009/065029
§ 371 (c)(1),
(2), (4) Date: May 12, 2011

(87) PCT Pub. No.: WO2010/057821
PCT Pub. Date: May 27, 2010

(65) Prior Publication Data
US 2011/0238893 A1    Sep. 29, 2011

(30) Foreign Application Priority Data
Nov. 24, 2008    (EP) ..................................... 08169734

(51) Int. Cl.
*G06F 13/00*    (2006.01)
*G06F 3/06*    (2006.01)

(52) U.S. Cl.
CPC ............ *G06F 3/0643* (2013.01); *G06F 3/0608* (2013.01); *G06F 3/0679* (2013.01)

(58) Field of Classification Search
CPC ... G06F 12/023; G06F 12/12; G06F 12/1054; G06F 12/0246
See application file for complete search history.

(56) References Cited

U.S. PATENT DOCUMENTS

| | | |
|---|---|---|
| 5,630,093 A | 5/1997 | Holzhammer et al. |
| 5,717,886 A | 2/1998 | Miyauchi |

(Continued)

FOREIGN PATENT DOCUMENTS

| | | |
|---|---|---|
| CN | 1922571 | 2/2007 |
| JP | H5-241741 | 9/1993 |

(Continued)

OTHER PUBLICATIONS

Tsai et al., "Configurable NAND Flash Translation Layer", Proceeding of the IEEE Conference on Sensor Networks, Ubiquitous, and Trustworthy Computer, [Online] Taichung, Taiwan, Jun. 5, 2006.

(Continued)

*Primary Examiner* — Sean D Rossiter
(74) *Attorney, Agent, or Firm* — Jack Schwartz & Associates, PLLC

(57) ABSTRACT

A Flash based memory comprising a Flash translation layer which comprises first translation information associating a first logical address of a logical file system emulating a sectored storage medium, the logical address being a logical sector start address with a first physical address of said flash based memory. The logical file system comprises a number of logical stuffing bits expanding a logical size of data of a file stored in said Flash based memory such that the expanded logical size corresponds to an integer number of logical sectors and the Flash translation layer comprises second translation information associating a second logical address with a second physical address and depending on said number of logical stuffing bits, the file being stored in a contiguous physical address sequence starting at the first physical address and ending at the second physical address.

5 Claims, 2 Drawing Sheets

(56) References Cited

U.S. PATENT DOCUMENTS

Figure 1:
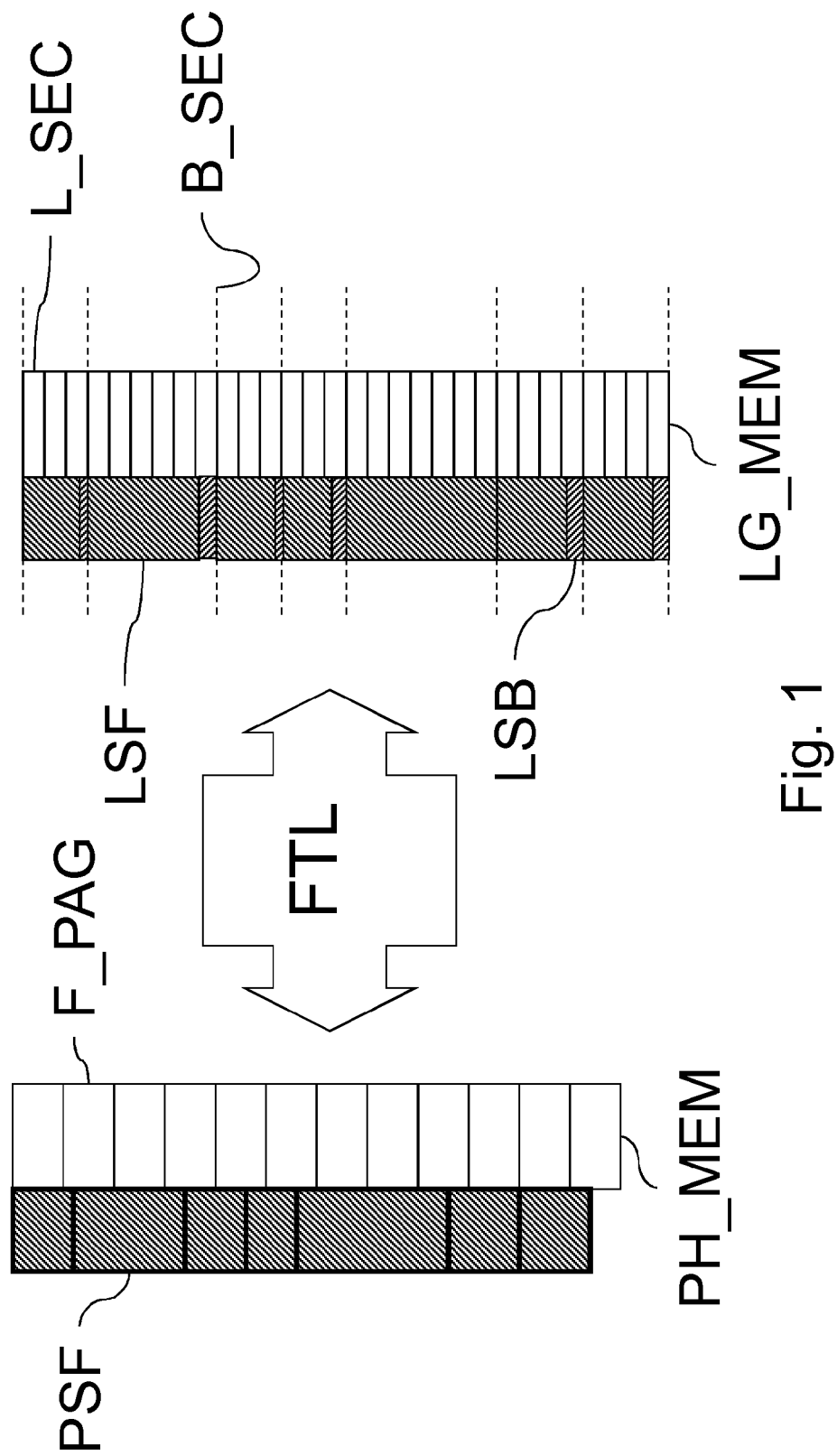

| | | | |
|---|---|---|---|
| 5,784,699 | A * | 7/1998 | McMahon et al. ............ 711/171 |
| 6,412,080 | B1 * | 6/2002 | Fleming et al. ................ 714/15 |
| 8,452,929 | B2 * | 5/2013 | Bennett ......................... 711/162 |
| 2003/0065876 | A1 * | 4/2003 | Lasser ........................... 711/103 |
| 2003/0113103 | A1 * | 6/2003 | Kaku ............................. 386/95 |
| 2004/0148315 | A1 * | 7/2004 | Itho ............................. 707/104.1 |
| 2005/0169058 | A1 | 8/2005 | Myong et al. |
| 2006/0015676 | A1 | 1/2006 | Oribe et al. |
| 2006/0179212 | A1 | 8/2006 | Kim et al. |
| 2006/0212674 | A1 | 9/2006 | Chung et al. |
| 2006/0285828 | A1 | 12/2006 | Moteki et al. |
| 2007/0033375 | A1 | 2/2007 | Sinclair et al. |
| 2007/0043924 | A1 | 2/2007 | Ito et al. |
| 2007/0143567 | A1 | 6/2007 | Gorobets |
| 2008/0098161 | A1 | 4/2008 | Ito et al. |
| 2008/0147964 | A1 * | 6/2008 | Chow et al. ................... 711/103 |
| 2010/0275037 | A1 * | 10/2010 | Lee et al. ...................... 713/189 |
| 2012/0011175 | A1 * | 1/2012 | Coates Lloyd ............... 707/822 |

FOREIGN PATENT DOCUMENTS

| | | |
|---|---|---|
| JP | 2002259171 | 9/2002 |
| JP | 2004013276 | 1/2004 |
| JP | 2004030232 | 1/2004 |
| JP | 2004192561 | 7/2004 |
| JP | 2006221636 | 8/2006 |
| JP | 200897718 | 4/2008 |
| WO | WO0052689 | 9/2000 |
| WO | WO2005066770 | 7/2005 |
| WO | WO2006070112 | 7/2006 |
| WO | WO2007049850 | 5/2007 |

OTHER PUBLICATIONS

Kang et al., "A Superblock-based Flash Translation Layer for NAND Flash Memory", Proceedings of the 6th ACM & IEEE International Conference on Embedded Software, Seoul, Korea, Oct. 22, 2006, pp. 161-170.

Search Report Dated Jan. 27, 2010.

Yi-Lin Tsai et al, "Configurable NAND flash translation layer," Proceedings of the IEEE International Conference on Sensor Networks, Ubiquitous and Trustworthy Computing (SUTC'06), Jun. 5, 2006, vol. 1, pp. 1-9.

Anonymous, "Volume and File Structure for Write-Once and Rewritable Write-Once and Rewritable Media using Non-Sequential Recording for Information Interchange", Standard ECMA-167, Jun. 1997, pp. 1-148.

Anonymous, "Understanding the Flash Translation Layer (FTL) Specification", INTEL Application Note AP-684, Dec. 1998, pp. 1-10.

Kim et al., "A Log-based Flash Translation Layer for Large NAND flash memory", Proceedings of the 8th International Conference on Advanced Communication Technology (ICACT2006), Feb. 20, 2006, pp. 1641-1644.

Wang, W., "Wenguang's Introduction to Universal Disk Format (UDF)", http://homepage.mac.com/wenguangwang/myhome/udf.html, Sep. 18, 2008, pp. 1-8.

Chung et al., "An efficient FTL Algorithm for flash memory", Journal of KISS: Computer Systems and Theory, vol. 32, No. 9-10, Oct. 2005, pp. 483-490. English Abstract.

Yi-Lin Tsai, et al. "Configurable NAND Flash Translation Layer" Proceedings of the IEEE International Conference on Sensor Networks, Ubiquitous and Trustworthy Computing (SUTC'06), 0-7695-2553-9/06.

Korean Intellectual Property Office, "Notice to Submit Response", Korean Patent Application No. 10-2011-7014476, dated Jun. 29, 2015.

* cited by examiner

FLASH BASED MEMORY COMPRISING A FLASH TRANSLATION LAYER AND METHOD FOR STORING A FILE THEREIN

This application claims the benefit, under 35 U.S.C. §365 of International Application PCT/EP2009/065029, filed Nov. 12, 2009, which was published in accordance with PCT Article 21(2) on May 27, 2010 in English and which claims the benefit of European patent application No. 08169734.4, filed Nov. 24, 2008.

BACKGROUND

The invention relates to a Flash based memory comprising a Flash translation layer and method for storing a file therein.

Flash based memories provide a significant advantage over other storage media like hard disks and optical media like DVD or BD: Flash memories need no moving parts to be accessed and thus cannot become inaccessible due to impacts impairing operation of the moving parts. This makes Flash a well suited storage device for mobile applications where rough conditions may occur.

One of such applications is the capturing of images, either stills or video frames. Flash based memories are used as storage in end consumer devices like digital still cameras and digital video cameras. Flash based memories can be found in MP3-players, also. Further, Flash based memories gain more and more importance as storage devices for professional digital film cameras.

Commonly, Flash memories have an internal storage management taking care of wear-levelling and error correction. Applications interact with the internal storage management via a so-called Flash translation layer (FTL). The FTL emulates a file system, for instance FAT32.

Theoretically, FAT32 file systems may have any size but practically very large FAT32 file systems become slow and inefficient. Therefore, in some operating systems FAT32 file system size is limited to 32 GB. Furthermore, the maximum possible file size on FAT32 is one byte less than 4 GByte and the number of files per directory which can be handled by FAT32 is limited to 1000. And due to the fact that clusters, the smallest logical amounts that can be allocated to hold a file, are large in FAT32, lots of storage capacity is wasted for stuffing bits to clusters to which files significantly smaller than the cluster size are stored.

FAT on removable media may be replaced by Universal Disk Format (UDF), a format specification of a file system for storing files on optical media. An FTL emulating a UDF appears from outside as a sectored storage medium.

Flash based memories have the disadvantage that—at least today—the price per GB is high compared to other storage media like optical disks.

Therefore, there is an ongoing effort in the art to exploit the storage capacity of Flash based memories as efficiently as possible.

INVENTION

The invention engages in this effort and proposes a Flash based memory comprising a Flash translation layer according to claim 1.

Said is, the Flash translation layer comprised in the Flash based memory comprises first translation information associating a first logical address of a logical file system with a first physical address of said memory wherein the logical file system emulates a sectored storage medium and the logical address is a logical sector start address, the logical file system comprises a number of logical stuffing bits expanding a logical size of data of a first file stored in said Flash based memory such that the expanded logical size corresponds to an integer number of sectors and the Flash translation layer comprises second translation information associating a second logical address with a second physical address, the second translation information depending on said number of logical stuffing bits wherein the data of the file is stored in a contiguous physical address sequence starting at the first physical address and the second physical address is adjacently succeeding the end of the contiguous physical address sequence.

Making the translation information dependent on said number of logical stuffing bits, logical stuffing required in the emulated file system for filling sectors may comprise more bits than physical stuffing in the Flash based memory. Thus, less Flash storage capacity is wasted on stuffing.

In an embodiment, the difference between said second logical address and said first logical address is by said number of logical stuffing bits larger than the difference between said second physical address and said first physical address.

Then files are stored as a contiguous sequence without any physical stuffing bits between files. This is useful for applications where files are unlikely to be edited or altered while being stored in the Flash based memory.

There is another embodiment wherein file system related metadata are stored in said Flash based memory separately from content-related user data.

This allows for storing the user data as a contiguous stream while the metadata—which is more likely to be altered—is stored in a different way which is more suited for altering.

In yet another embodiment, said Flash based memory comprises a NAND-Flash memory and said logical file system is in conformance with ISO 13346.

Further said logical file system may emulate sectors of 2048 bytes.

The different embodiments of the Flash based memory are particularly suited for content-related user data which comprises image data of one or more still pictures or video frames.

The invention further proposes a method for storing a file in a Flash based memory comprising a Flash translation layer.

Said method comprises the steps of storing data of the file in a contiguous physical address sequence starting at a first physical address wherein the Flash translation layer comprises first translation information associating a first logical address of a logical file system with the first physical address of said memory, determining a second physical address adjacently succeeding the end of the contiguous physical address sequence, determining a second logical sector start address in dependence on a number of logical stuffing bits required for expanding the size of the data of the file such that the expanded size corresponds to an integer number of sectors and adding second translation information to said Flash translation layer, said second translation information associating said second logical address with a second physical address.

DRAWINGS

Exemplary embodiments of the invention are illustrated in the drawings and are explained in more detail in the following description.

Figure 2:
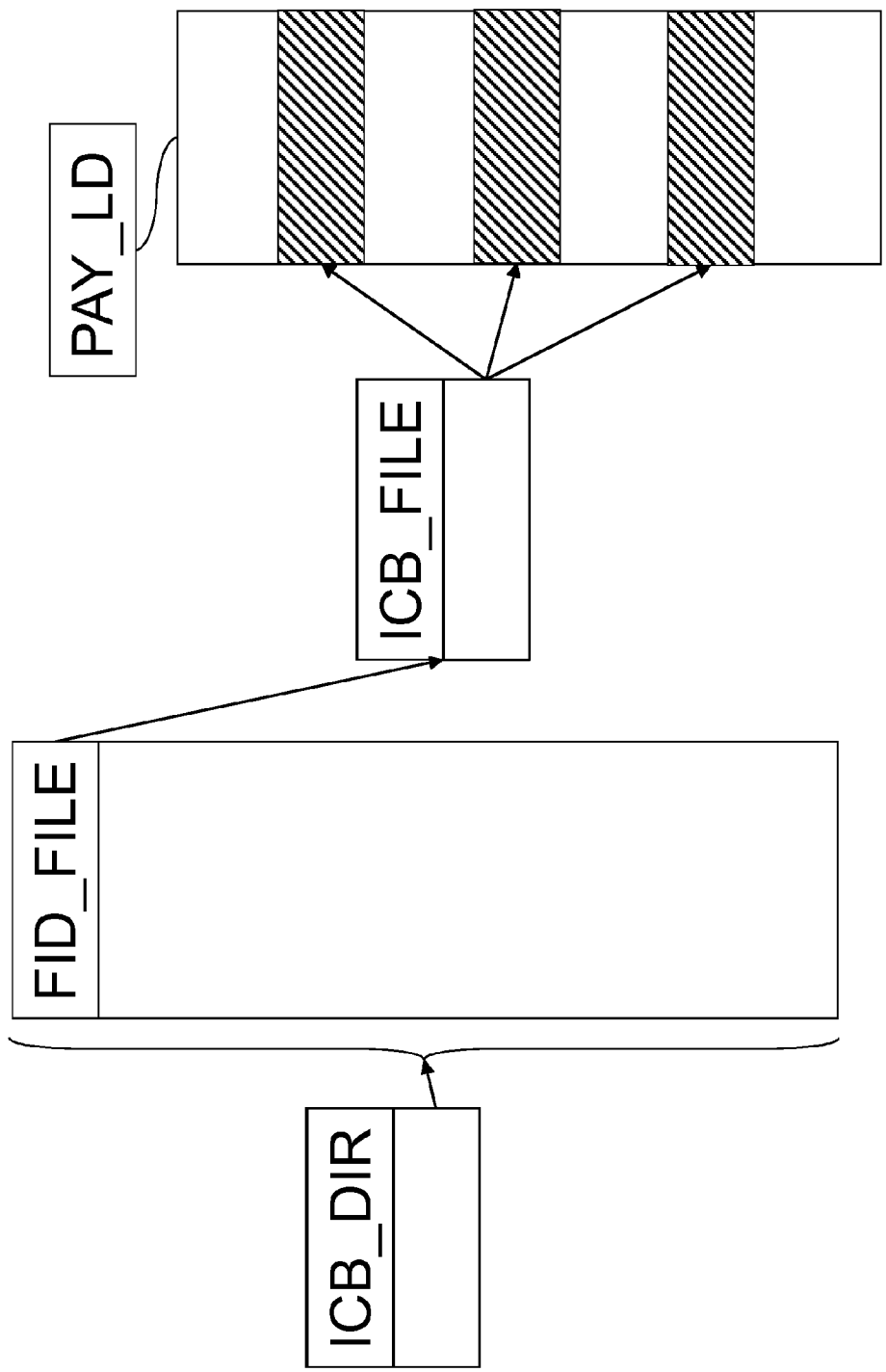

In the figures:

FIG. 1 exemplarily depicts a flash translation layer mapping a logical storage representation on a physical storage device FIG. 2 exemplarily depicts the relationship between a directory's information control block pointing to the directory, i.e. to its file identifier descriptor table. The first file identifier descriptor of this directory points to another file information control block. Finally, this information control block indicates the location of the actual pay load data

EXEMPLARY EMBODIMENTS

In storage management, a logical storage management may be decoupled from physical properties of underlying storage structures by help of an interfacing layer. This allows for using the same logical storage management system independent from the physicality of the storage device. For instance, Flash memories like SD or MMC have a controller implementing a flash translation layer which translates between the external world and the internal representation of the memory.

The controller takes care of the special Flash memory properties, e.g. erasable blocks, deleted blocks, written blocks etc. The controller provides the access to such specific memory behaviour, i.e. it erases deleted block before writing to it and realizes the wear-levelling by avoiding too frequent re-use of the same memory block in order to respect the limited number of write-cycles of Flash memory blocks.

As most physical storage devices are sector based, common logical file management systems like FAT32, NTFS or UDF are sector-based, too. That is, files with a size which does not correspond to the size of an integer number of sectors are stuffed with logical stuffing bits such that their size becomes equal to the size of an integer number of sectors.

This is useful in particular if the underlying storage device is sector-based for keeping the mapping between physical storage and logical file system simple.

Further, stuffing allows for slight variation of file size in response to an editing of the file without requiring fragmentation of the file. That is, a slight file size increase due to editing or updating of the file may be compensated by a corresponding reduction of the number of stuffing bits. This also helps for keeping file management simple. Therefore, physical stuffing bits are provided even in storage devices which do not require any sector alignment.

There are data acquisition applications like professional digital film capturing which produce very large numbers of files. These applications mainly gather the data and store them in files associated with a moment or interval in time, for instance frames in the professional digital film capturing example are stored in separate files. This makes it easy to retrieve a certain frame later on for editing or processing.

Commonly, the gathered data is stored in a Flash memory or a Flash memory array intermediately. Before being edited or processed, the gathered data is transferred from the Flash memory based storage device to another storage device like a hard disk drive. The freed memory parts are then re-used for gathering new data while the transferred data is edited or processed on the hard disk.

Thus, in this scenario no file altering occurs on the Flash memory based storage device and therefore there is no necessity for avoiding fragmentation by help of physical stuffing bits.

Further, due to the large number of files produced, e.g. 60 frames per second, the amount of physical stuffing bits is large, too. Hence, if physical stuffing is performed a significant amount of storage space is kept empty although it is neither needed for reasons of the physical structure of the Flash based storage device nor for avoidance of fragmentation in course of editing or processing as no such editing or processing is performed while the files reside in the Flash based storage device.

In such scenario reduction or avoidance of physical stuffing bits is advantageous.

In an exemplary embodiment depicted in FIG. 1, a Flash translation layer FTL is implemented in the controller such that a mapping of the Flash memory based storage device PH_MEM onto a logical Universal Disk Format 2.50 (UDF 2.50) LG_MEM is realized. This FTL emulates the logical Universal Disk Format LG_MEM comprising logical sectors L_SEC of 2048 bytes limited by sector borders B_SEC and provides compatibility with Linux or Windows operation systems.

For readability, only a single sector border B_SEC is provided with a reference sign, but all dashed lines shall represent sector borders in FIG. 1. The same applies to logically stored files LSF, depicted as boxes diagonally striped from lower left to upper right, and to logical stuffing bits LSB, depicted as boxes diagonally striped from lower right to upper left. As well only one of the boxes diagonally striped from lower left to upper right which depict physically stored files PSF is provided with the corresponding reference sign.

AS depicted, logical stuffing bits LSB are comprised in the logical memory LG_MEM but are absent in physical memory PH_MEM. In the physical memory PH_MEM the user data or pay load data of the files PSF is comprised as a contiguous data block.

UDF 2.50 allows for storing metadata (MD) solely related to properties of files as one or more metadata blocks separately from the actual user data (UD) comprised in the files. This allows the Flash controller for fast access to metadata. Further, the user data can be recorded as a contiguous stream while still being easily separable into the constituting files. Thus, the constituting files are not stuffed physically which safes a significant amount of storage capacity. Only the stream as a whole may be stuffed physically such that is stuffed size corresponds to an integer multiple of 2084 byte sectors.

Separation of metadata from user data is useful also as final storage of the metadata may be postponed until all user data is recorded in the Flash based storage. Until then, the metadata is buffered.

So, in an exemplary real-time film capturing scenario, the user data, e.g. the captured frames, are written as a contiguous data sequence to the Flash based storage and metadata, e.g. frame identifiers and storage addresses allowing for separating the user data into frames, is generated on-the-fly. But, the generated metadata is intermediately buffered until recording of the user data is finished. Then, the generated metadata is transferred from the buffer to the Flash based memory.

So, during recording of the user data stream as a contiguous data sequence no addressing related to the metadata block is required.

The contiguous recording is useful in particular in the digital film capturing scenario as huge data amounts accumulate in this scenario and storage of said huge data amounts has to take place in real-time wherein physical storage to Flash is the bottleneck. Thus, an increase in storage speed achieved by help of contiguous recording is very advantageous.

For instance, a scene shot of a film may be recorded as a contiguous stream of frames each constituting a file. Then, the frames are fast and easily accessible by help of the separately stored metadata identifying the frame and its storage location, for instance by help of a time stamp and a physical address.

If the captured frames comprise the uncompressed raw data captured for instance by a CCD or a CMOS sensor the data amount per frame is constant. Thus, not only single frames but also frame sequences of a desired number of frames are easily accessible. Mainly, a start address of the sequence is required. Then, data is read until the amount of data read corresponds to the data amount comprised in the desired number of frames.

It may be useful to record some files as the described contiguous stream while other files are recorded conventionally, for instance as the other files may be subjected to editing while residing in the Flash. For instance, metadata like a scene description written before, during or shortly after a scene shot may be recorded in the Flash, also. Such a scene description may already been altered while being on a film set, i.e. while the scene description resides in the Flash based memory. Therefore the file comprising the scene description may be stored in conventional manner with stuffing bits. Conventional storage may be applied for none, some or all metadata, particularly for the metadata stored separately by help of UDF 2.50.

For instance, if re-naming of files containing image frames of a shot film scene is allowed the name of the frames may be stored with some physical stuffing bits as to avoid fragmentation as a result of re-naming.

If metadata is not separated from user data and some other scenarios, it may also be useful that files are stored with a tiny amount of physical stuffing bits which is smaller than the amount of logical stuffing bits required for sector alignment. Then, editing of the files in the Flash is possible without leading to fragmentation and still some physical storage capacity is gained.

For allowing the FTL to handle conventionally stored files different from files of user data being stored as a contiguous sequence, a naming convention is exemplarily proposed. For instance, if user data of a file is stored as part of a contiguous sequence an exemplary identifier string "$CTGS$_" is prepended to the file name of said file. Additionally or alternatively, files stored in contiguous manner are organized in directories wherein the names of said directories are starting with said exemplary identifier string "$CTGS$_".

FIG. 2 depicts that the information on whether a given file is recorded contiguously or not may also or alternatively be provided in the Implementation Use Field specified in UDF 2.50. E.g. a 4-character string "CTGS" stored in remaining 4 bytes of ImpUse[ ] may be used as indicator in the Implementation Use Field of information control blocks ICB_DIR of directories carrying contiguously recorded files and/or the Implementation Use Fields of information control blocks ICB_FILE of the contiguous recorded files.

Or, Implementation Use Field of file identifier table entries FID referenced by information control blocks ICB_DIR of directories and referencing said information control blocks ICB_FILE of the contiguous recorded files may be used wherein the information control blocks ICB_FILE of the contiguous recorded files reference the pay load data PAY_LD. The first 32 bytes of file identifier table entries FID are preoccupied by UDF so bytes after said 32 bytes can be used for the purpose of indicating contiguous storage. The indication then indicates that the logical order according to FID is in correspondence to the physical order of the user data of the files in the Flash.

Further, the Implementation Use Fields of contiguously recorded files may also carry the additional information required for mapping the logical address of a contiguous recording file to the physical address. Information related to a virtual offset induced by the logical stuffing bits for which no physical equivalence exists may be comprised in the Implementation Use Field.

Or, the offset information may be stored as further metadata.

Information control blocks ICB_DIR of directories, information control blocks ICB_FILE of contiguous recorded files, FID-Sequences and actual pay load data commonly reside at different and/or distinguishable positions of the memory.

This invention provides a simple way to apply a sector-based file system to Flash storages allowing for write speed at maximum level through contiguous writing. Further, an FTL is provided which is able to recognize automatically (MD/UD, file/dir name) the most efficient (MD vs. UD) or desired (contiguous or not) method to place incoming files.

This invention provides a way to store file bursts, e.g. a sequence of picture files, with a minimum delay.

The invention claimed is:

1. A NAND-flash based memory comprising a Flash translation layer wherein the Flash translation layer comprises first translation information associating a first logical address of a logical file system with a first physical address of said flash based memory wherein
   the logical file system represents an ISO 13346 UDF file format of at least version 2.50 and emulates a sectored storage medium and the logical address is a logical sector start address,
   the logical file system comprises a number of logical stuffing bits expanding a logical size of data of a file stored in said Flash based memory such that the expanded logical size corresponds to an integer number of logical sectors and
   the Flash translation layer comprises second translation information associating a second logical address with a second physical address, the second translation information depending on said number of logical stuffing bits wherein
   the data of the file is stored in a contiguous physical address sequence starting at the first physical address, and
   the second physical address is adjacently succeeding the end of the contiguous physical address sequence,
      wherein the difference between said second logical address and said first logical address is by said number of logical stuffing bits larger than the difference between said second physical address and said first physical address,
      and wherein file system related metadata and content-related user data of files are stored in separate storage areas of said Flash based memory.

2. The flash based memory according to claim 1, wherein said logical file system emulates logical sectors of 2048 bytes.

3. The flash based memory according to claim 1, wherein said content-related user data comprises image data of one or more still pictures or video frames.

4. A method for storing a file in a NAND-Flash based memory comprising a Flash translation layer wherein the Flash translation layer comprises first translation information associating a first logical address of a logical file system with a first physical address of said Flash based memory, wherein
   the logical file system represents an ISO 13346 UDF file format of at least version 2.50 and emulates a sectored storage medium and the logical address is a logical sector start address,
   the logical file system comprises a number of logical stuffing bits expanding a logical size of data of a file stored in said Flash based memory such that the expanded logical size corresponds to an integer number of logical sectors,
   said method further comprising:
   storing data of the file in a contiguous physical address sequence starting at the first physical address, determining a second physical address adjacently succeeding the end of the contiguous physical address sequence, determining a second logical sector start address in dependence on a number of logical stuffing bits (LSB) required for expanding the size of the data of the file such that the expanded size corresponds to an integer number of sectors and adding second translation information to said Flash translation layer, said second translation information associating said second logical address with said second physical address, wherein the difference between said second logical address and said first logical address is by said number of logical stuffing bits larger than the difference between said second physical address and said first physical address, and wherein file system related metadata and content-related user data of files are stored in separate storage areas of said Flash based memory.

5. The method according to claim 4, wherein said content-related user data comprises image data of one or more still pictures or video frames.

\* \* \* \* \*